(12) United States Patent
Uchida

(10) Patent No.: US 6,898,438 B1
(45) Date of Patent: May 24, 2005

(54) MOBILE TERMINAL, MOBILE COMMUNICATION SYSTEM, AND POWER CONSUMPTION SUPPRESSING METHOD FOR MOBILE TERMINAL

(75) Inventor: Wataru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 710 days.

(21) Appl. No.: 09/593,158

(22) Filed: Jun. 14, 2000

(30) Foreign Application Priority Data

Jun. 15, 1999 (JP) .......................................... 11-168219

(51) Int. Cl.$^7$ .............................. G06F 1/26; G06F 1/32
(52) U.S. Cl. ..................... 455/522; 455/343.5; 455/574
(58) Field of Search ......................... 455/522, 572–574, 455/561, 566, 343.1, 343.5, 123, 115, 127.1; 320/135–136

(56) References Cited

U.S. PATENT DOCUMENTS

| | | | | | |
|---|---|---|---|---|---|
| 5,822,318 | A | * | 10/1998 | Tiedemann et al. | 370/391 |
| 5,845,142 | A | * | 12/1998 | Hayasaka | 713/340 |
| 5,889,604 | A | * | 3/1999 | Hayashi | 398/192 |
| 5,950,124 | A | * | 9/1999 | Trompower et al. | 455/422.1 |
| 6,026,303 | A | * | 2/2000 | Minamisawa | 455/446 |
| 6,029,074 | A | * | 2/2000 | Irvin | 455/571 |
| 6,067,171 | A | * | 5/2000 | Yamada et al. | 358/406 |
| 6,134,226 | A | * | 10/2000 | Reed et al. | 370/328 |
| 6,236,214 | B1 | * | 5/2001 | Camp et al. | 324/427 |
| 6,463,305 | B1 | * | 10/2002 | Crane | 455/566 |
| 6,516,201 | B2 | * | 2/2003 | Kanbara et al. | 455/551 |
| 6,658,249 | B1 | * | 12/2003 | Hietalahti et al. | 455/422.1 |

FOREIGN PATENT DOCUMENTS

| | | |
|---|---|---|
| JP | 1-120136 | 5/1989 |
| JP | 8-65230 | 3/1996 |
| JP | 8-70273 | 3/1996 |
| JP | 10-93500 | 4/1998 |

* cited by examiner

Primary Examiner—William Trost
Assistant Examiner—Brandon J. Miller
(74) Attorney, Agent, or Firm—Sughrue Mion, PLLC

(57) ABSTRACT

Power consumption of a mobile terminal is suppressed by regulating a data transmission rate, depending on a residual amount of battery power. Battery holding times and maximum data transmission rates are stored in a table. A battery holding time calculation unit calculates an estimated battery holding time on the basis of a residual amount of battery power detected by a battery residual amount detection unit and transmission power information generated by the transmission power control unit. A comparison unit reads out from the table the maximum data transmission rate which corresponds to the estimated battery holding time, and compares the read-out maximum data transmission rate with the data transmission rate to be used by the mobile terminal. By using a lower data transmission rate obtained as the comparison result, a call request is made by the mobile terminal.

7 Claims, 3 Drawing Sheets

F I G.1
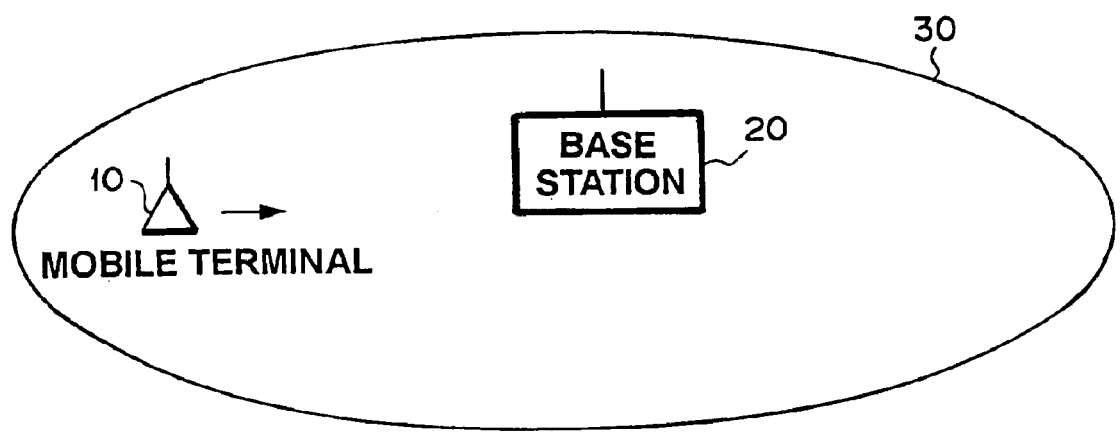

CALL REQUEST TEXT

MOBILE TERMINAL, MOBILE COMMUNICATION SYSTEM, AND POWER CONSUMPTION SUPPRESSING METHOD FOR MOBILE TERMINAL

BACKGROUND OF THE INVENTION

1. Technical Field of the Invention

The present invention relates to a mobile terminal for a mobile communication system, and particularly, to a technique for suppressing a power consumption of the mobile terminal.

2. Description of the Prior Art

In the mobile communication systems, various techniques for transmitting a large amount of data such as image data within a short period of time have been researched and developed. For example, the data transmission rate of IMT-2000 as one of the next-generation mobile communication system is supposed to be 2 Mbps, in order to realize the highest-speed transmission ever in practical use.

In the mobile communication systems, higher transmission rate is desired. However, as the data transmission rate increases, processing loads on a base station and a mobile terminal increase, and the power consumption increases. In particular, a base station must communicate with a large number of mobile terminals at once at a high data transmission rate. Therefore, the apparatus for the base station becomes large-sized and expensive. In addition, since the electric power of the mobile terminal is supplied from a battery, an increase in power consumption is a crucial disadvantage.

Therefore, in the conventional mobile communication system, a low transmission rate is used, when an amount of information to be transmitted is small as in audio communication, while a high transmission rate is used, when an amount of information is large as in image data transmission. More specifically, when the mobile terminal starts calling, the mobile terminal notifies or requests a data transmission rate to be used in data transmission to the base station. The base station inspects whether or not a reception or processing of the signal from the mobile terminal at the requested data transmission rate is possible, on the basis of the capability of the base station and a present processing state. If the reception is possible, the base station permits a mobile terminal to transmit the signal at the requested data transmission rate. If the reception at the requested data transmission rate is not possible, the base station allocates a lower transmission rate for the mobile terminal. In this manner, in the conventional mobile communication system, communication is performed at a data transmission rate depending on an amount of information to be transmitted, thereby reducing a processing load on the base station so as to avoid the apparatus from being increased in size as well as to suppress the power consumption of the mobile terminals.

However, in a conventional mobile communication system, a user of mobile terminal directly notifies a designated data transmission rate to the base station. Therefore, for example, even if a residual amount of battery power of the mobile terminal is small, data transmission is performed at a high data transmission rate as designated by the mobile terminal. As a result, the residual amount of battery power is rapidly consumed. In the worst case, the battery runs out in the middle of data transmission.

There is disclosed a mobile terminal comprising a monitor unit for monitoring the degree of consumption of a battery, in JP1-120136 A (1989). However, the monitor unit merely monitors the degree of consumption of the battery in order to exchanging batteries timely. Therefore, the monitor unit is not aimed to suppress a power consumption.

Further, there is disclosed an invention for reducing the power consumption of a mobile terminal using a battery in a variable rate radio communication is disclosed, in JP7-38620 A (1995). However, this mobile terminal performs transmission and reception, not at various transmission rates, but at a constant data transmission rate.

SUMMARY OF THE INVENTION

Therefore, an object of the present invention is to provide a mobile terminal which regulates a maximum data transmission rate, depending on a residual amount of battery power, in order to suppress the power consumption.

Further, another object of the present invention is to provide a mobile communication system including the power saving mobile terminals.

Still another object of the present invention is to provide a power saving method for the mobile terminal.

The mobile terminal of the present invention notifies the base station of the data transmission rate, when the mobile terminals request a call.

The mobile terminal of the present invention comprises: an input means for inputting the data transmission rate to be used in the data transmission; a residual amount detection means for detecting a residual battery power; and a communication rate regulating means for regulating the data transmission rate to be used in the data transmission, on the basis of the residual battery power.

The communication rate regulating means comprises: a table describing the relation between prescribed battery holding times and prescribed maximum data transmission rates; a battery holding time calculation unit for calculating a estimated battery holding time, on the basis of the residual battery power and the received electric field strength; and a comparison means for searching for a prescribed battery holding time which is equal to the estimated holding time, reading out a prescribed maximum data transmission rate corresponding to the searched battery holding time, and comparing the read-out maximum data transmission rate with the requested data transmission rate. On the basis of the comparison result, the lower data transmission rate is notified to the base station.

Further, the mobile terminal of the present invention may comprise a transmission power control unit which receives a transmission signal from the base station and controls a transmission power, depending on an electric field strength of the received transmission signal.

Further, the mobile communication system of the present invention comprises a plurality of the mobile terminals described above.

Further, the power consumption suppressing method of the present invention comprises the steps of: detecting a residual amount of battery power, when the data transmission rate is inputted into the input means; regulating the data transmission rate to be used, on the basis of the residual battery power; and notifying the base station of the regulated data transmission rate.

The power consumption suppressing method of the present invention is characterized in that a data transmission rate is regulated, depending upon the residual battery power.

The power consumption suppressing method may further comprise the step of receiving a transmission signal from the base station to generate a signal representing the electric field strength of the received signal.

The step of regulating the data transmission rate may regulate the data transmission rate to be used, on the basis of both the residual amount of battery power and the received electric field strength.

Further, the step of regulating the data transmission rate may comprise: the step of: calculating a estimated holding time of the battery, on the basis of both residual battery power and the electric field strength; reading out a prescribed mximum data transmission rate corresponding to the estimated battery holding time from the table of the prescribed battery holding times and prescribed maximum data transmission rates; comparing the read-out prescribed maximum data transmission rate with the requested data transmission rate; and notifying the base station of the lower data transmission rate, on the basis of the comparison result.

According to the present invention, the power consumption is suppressed, and the battery maintains a long life, because the data transmission rate desired by the user of the mobile terminal is regulated by the maximum data transmission rate corresponding to the calculated battery holding time.

BRIEF EXPLANATION OF THE DRAWINGS

FIG. 1 is an illustration of a mobile communication system using the mobile terminal of the present invention.

PREFERRED EMBODIMENT OF THE INVENTION

FIG. 1 shows a mobile communication system using a mobile terminal 10 according to an embodiment of the present invention. Referring to FIG. 1, a base station 20 has a service zone 30. The mobile terminal 10 can communicate with the base station 20, when the mobile terminal 10 is located in the service zone 30. More specifically, the mobile terminal 10 receives a control signal from the base station.

Figure 2:
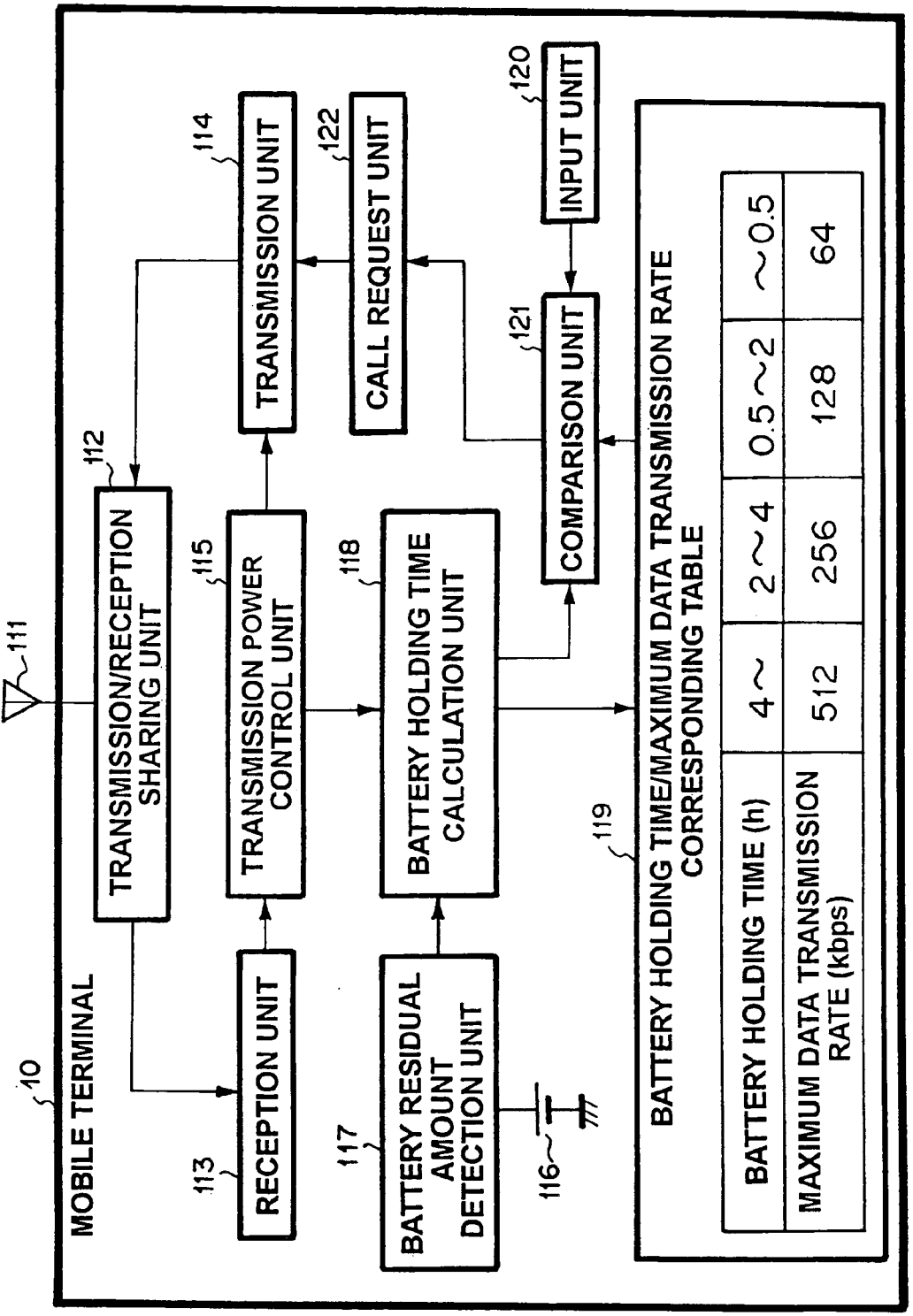
FIG. 2 is a block diagram of the mobile terminal of the present invention.

FIG. 2 is a block diagram of the mobile terminal 10. The mobile terminal as shown in FIG. 2 comprises: antenna 111 for transmitting and receiving a radio signal to/from the base station 20; transmission/reception sharing unit 112 for sharing the antenna 111 in transmission/reception; reception unit 113 for processing the received signal and measuring an electric field strength of the received signal; transmission unit 114 for outputting a transmission signal; transmission power control unit 115 for controlling the electric power outputted from the transmission unit 114, on the basis of the electric field strength measured by the reception unit 113; battery residual amount detection unit 117 for detecting a residual power of battery 116; battery holding time calculation unit 118 for calculating a battery holding time on the basis of the electric field strength from the transmission power control unit 115 and the residual battery power from the battery residual amount detection unit 117; battery holding time/maximum data transmission rate corresponding table 119 for holding information representing the relationship between battery holding times and maximum data rates; input unit 120 for inputting a data transmission rate which is requested by a userof the mobile terminal; comparison unit 121 for comparing the data transmission rate inputted into the input unit 120 with the maximum data transmission rate in the table 119 to output the lower one; and call request unit 122 for generating a call request signal including the requested data transmission rate or the maximum data transmission rate which is outputted from the comparison unit 121.

The antenna 111 of the mobile terminal 10 receives a radio signal from the base station and output the radio signal to the transmission/reception sharing unit 112 as a reception signal. The transmission/reception sharing unit 112 supplies the reception signal received from the antenna 111 to the reception unit 113.

When the reception unit 113 receives the reception signal from the transmission/reception sharing unit 112, the reception unit 113 measures the received electric field strength and output the measurement result to the transmission power control unit 115. The reception unit 113 performs signal processing such as demodulation or decoding.

The transmission power control unit 115 determines a transmission power on the basis of the received electric field strength measured by the reception unit to notify the transmission unit 114 of the determined transmission power. Thus, the strength of the radio signal received by the base state in becomes constant. More specifically, when the mobile terminal is far away from the base station, the transmission power is increased, while the mobile terminal is near the base station, the transmission power is decreased.

The transmission unit 114 outputs the transmission signal to the transmission/reception sharing unit 112 at the transmission power determined by the transmission unit 114. The transmission/reception sharing unit 112 supplies the transmission signal from the transmission unit 114 to the antenna 111. The antenna 111 transmits the transmission signal from the transmission/reception sharing unit 112 to an air section as a radio signal.

When the input unit 120 receives a data transmission rate to be used, the battery residual amount detection unit 117 detects a residual amount of power of the battery 116 and notifies the battery holding time calculation unit 118 of the detection result.

Reception electric field strength information and transmission output information are supplied from the transmission power control unit 115 to the battery holding time calculation unit 118. When the residual amount of battery power outputted from the battery residual amount detection unit 117 is inputted into to the battery holding time calculation unit 118, the battery holding time calculation unit 118 calculates a battery holding time when a transmission operation is continuously performed at a basic data transmission rate on the basis of the residual amount of battery power and the received electric field strength information or the transmission output information. Since the transmission operation occupies a large part of the power consumption of the mobile terminal, the battery holding time can be calculated in a fair accuracy by using the transmission output information or the received electric field strength. The basic data transmission rate is a data transmission rate in an air section when the most basic service such as audio communication is provided in the mobile communication system. More specifically, as a method of increasing the data transmission rate in the air section, a method of using a plurality of time slots are used in the TDMA system, and a method of using a plurality of diffusion codes are used in a CDMA system, although power consumptions are increased by the increases in data transmission rates in both cases. The battery holding time calculation unit 118 outputs the calculated battery holding time to the table 119.

In the table 119, the battery holding time when the transmission operation is performed at the basic data transmission rate and the maximum data transmission rate corresponding to the battery holding time are registered. The table 119 reads out the maximum data transmission rate corresponding to the battery holding time calculated by the battery holding time calculation unit 118 in order to output the maximum data transmission rate to the comparison unit 121.

The maximum data transmission rate is a data used as a request data transmission rate, when the data transmission rate inputted into the input unit 120 is higher than the maximum data transmission rate. As shown in FIG. 2, the transmission rate is higher, as the battery holding time is long. Concretely, when the battery holding time is set to be shorter than 0.5 hours, 0.5 hours or more and shorter than 2 hours, 2 hours or longer and shorter than 4 hours, and 4 hours or longer, the maximum data transmission rate is set to be 64 kbps, 128 kbps, 256 kbps, and 512 kbps, respectively. In this example, 64 kbps is the basic data transmission rate.

The comparison unit 121 compares the data transmission rate input from the input unit 120 with the maximum data transmission rate in the table 119. When the data transmission rate from the input unit 120 is lower than the maximum data transmission rate, the data transmission rate from the input unit 120 is directly output to the call request unit 122. On the contrary, the data transmission rate from the input unit 120 is higher than the maximum data transmission rate, the maximum data transmission rate is outputted to the call request unit 122. Thus, the user's request or the data transmission rate from the input unit 120 is regulated.

Figure 3:
FIG. 3 is a signal structure of the call request text generated by the call request unit in FIG. 2.

The call request unit 122 generates a call request text having a data transmission rate request portion as shown in FIG. 3. The data transmission rate or the maximum data transmission rate from the comparison unit 121 is inserted into the data transmission rate request portion. The call request unit 122 outputs the generated call request text to the transmission unit 114.

The transmission unit 114 encodes or modulates the call request text outputted from the call request unit 122, and outputs the text toward the transmission/reception sharing unit 112. The transmission/reception sharing unit 112, as described above, supplies a signal from the transmission unit 114 to the antenna 111. The antenna 111 transmits a signal from the transmission/reception sharing unit 112 to the base station as a radio signal.

As described above, in the mobile terminal according to this embodiment, wherein the data transmission rate requested from the base station is to be changed depending on a residual amount of battery power, the power consumption of the battery can be suppressed. Further, the data transmission rate can be changed depending on a transmission power, the power consumption of the battery can be suppressed more appropriately.

Figure 4:
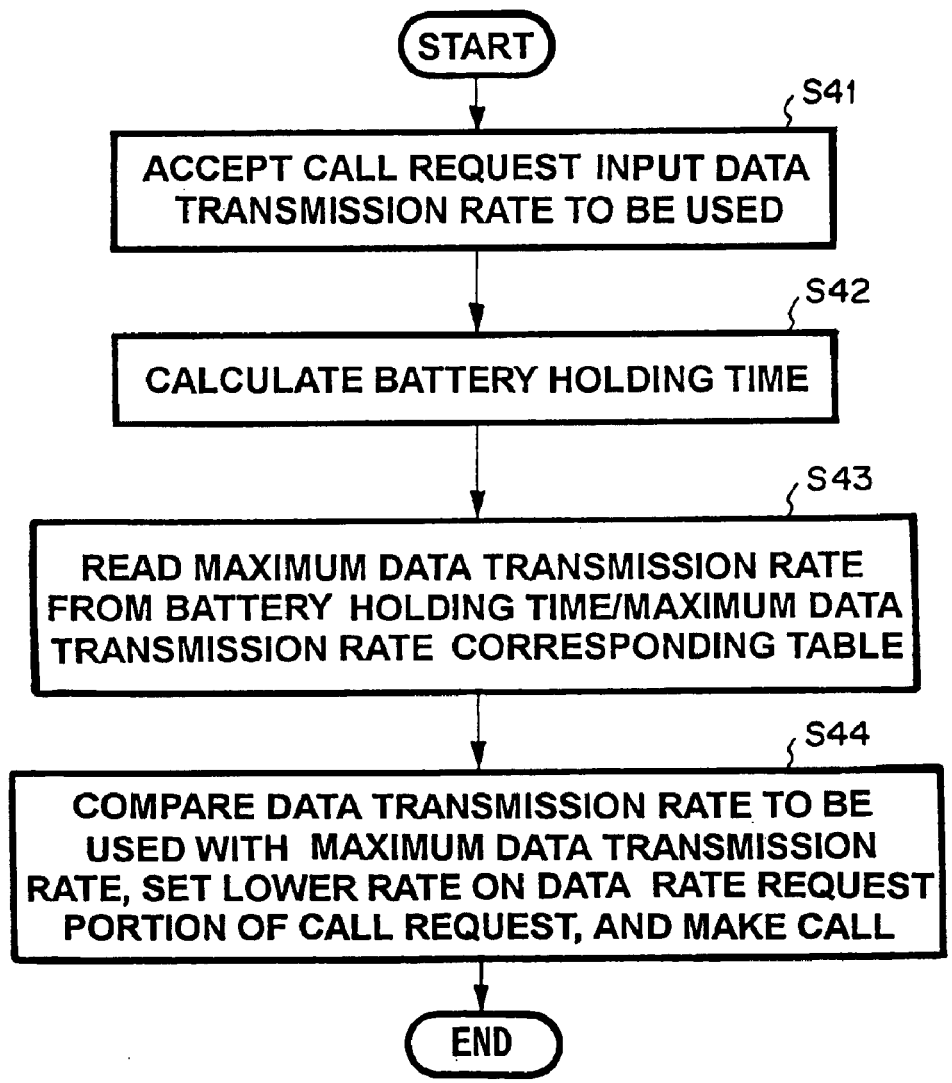
FIG. 4 is a flow chart for explaining an operation of the mobile terminal as shown in FIG. 2.

The operation of the mobile terminal 10 in FIG. 2 in call request is explained, referring to FIG. 4.

In step S41, a user inputs a data transmission rate to be used to the input unit 120. Here, it is assumed that 512 kbps are requested.

In step S42, the battery holding time calculation unit 118 calculates a battery holding time when the mobile terminal 10 performs transmission at the basic data transmission rate on the basis of a residual amount of battery power and transmission output information. Here, it is assumed that the battery holding time is 1.5 hours.

In step S43, the maximum data transmission rate corresponding to the calculated battery holding time is read out from the table 119. In this case, since the calculated holding time is 1.5 hours, the maximum data transmission rate is 128 kbps.

In step S44, the comparison unit 121 compares a data transmission rate to be used with the maximum data rate to output a lower one to the call request unit 122. In this case, since the data transmission rate to be used is 512 kbps, and the maximum data transmission rate is 128 kbps, the maximum data transmission rate is notified to the call request unit 122. The call request unit 122 sets the maximum data transmission rate as a request data transmission rate on the data rate request portion of a call request text. The mobile station 10 makes a call to the base station 20 by using the call request text.

What is claimed is:

1. A mobile terminal which notifies a base station of a data transmission rate to be used by said mobile terminal, when said mobile terminal starts a call, which comprises:

an input means for inputting said data transmission rate;

a residual amount detection means for detecting a residual amount of battery power; and a communication rate regulating means for regulating said data transmission rate, on the basis of said residual amount of battery power.

2. The mobile terminal according to claim 1, which further comprises:

a transmission power control unit which receives a downward signal from said base station and controls a transmission power of a upward signal from said base station, depending upon an electric field strength of said downward signal, wherein said communication rate regulating means regulates said data transmission rate, on the basis of both said residual amount of battery power and said electric field strength.

3. The mobile terminal according to claim 2, wherein said communication rate regulating means comprises:

a table for storing prescribed battery holding times and prescribed maximum data transmission rates;

a battery holding time calculation unit for calculating an estimated battery holding time, on the basis of said residual amount of battery power and said electric field strength; and a comparison means for searching one of said prescribed battery holding times which is equal to said estimated holding time, reading out one of said prescribed maximum data transmission rate corresponding to the searched battery holding time in said table, comparing the read-out maximum data transmission rate with said data transmission rate, and notifying said base station of the lower data transmission rate, on the basis of the comparison result.

4. A mobile communication system, wherein a plurality of data transmission rates are employed, which comprises:

a base station for controlling data communications in a service area and executing call services; and a plurality of mobile terminals for requesting said call services, by deciding each transmission data rate of an upward signal toward said base station, on the basis of each residual battery power and each transmission power of a downward signal from said base station.

5. A power consumption suppressing method for a mobile terminal for notifying a base station of a data transmission rate to be used by said mobile terminal, when said mobile terminal starts a call, which comprises the steps of:

detecting a residual amount of battery power of said mobile terminal, when said data transmission rate is inputted into said mobile terminal;

regulating said data transmission rate, on the basis of said residual amount of battery power; and notifying said base station of the regulated data transmission rate.

6. The power consumption suppressing method according to claim 5, which further comprises the steps of:

receiving a downward signal from said base station; and generating a signal representing an electric field strength of said downward signal, wherein said data transmission rate to be used by said mobile terminal is regulated, on the basis of said residual amount of battery power of said mobile terminal and said electric field strength of said downward signal.

7. The power consumption suppressing method according to claim 6, wherein the step of regulating the data transmission rate further comprises the steps of:

calculating an estimated battery holding time of a battery of said mobile terminal, on the basis of said residual amount of battery power of said mobile terminal and said electric field strength from said base station;

reading out one of prescribed maximum data transmission rates corresponding to said estimated battery holding time from a table for storing said prescribed battery holding times and prescribed maximum data transmission rates;

comparing the read-out maximum data transmission rate with said data transmission rate to be used by said mobile terminal; and notifying said base station of the lower data transmission rate, on the basis of the comparison result.

* * * * *